US007385796B2

(12) United States Patent
Flanders

(10) Patent No.: US 7,385,796 B2
(45) Date of Patent: Jun. 10, 2008

(54) FIRE SAFETY FUSIBLE LINK ELECTRICAL TERMINAL BLOCK

(75) Inventor: Patrick S. Flanders, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 366 days.

(21) Appl. No.: 10/528,292

(22) PCT Filed: Sep. 17, 2003

(86) PCT No.: PCT/US03/29921

§ 371 (c)(1),
(2), (4) Date: Aug. 3, 2005

(87) PCT Pub. No.: WO2004/027932

PCT Pub. Date: Apr. 1, 2004

(65) Prior Publication Data

US 2006/0098370 A1 May 11, 2006

(51) Int. Cl.
*H02H 5/00* (2006.01)

(52) U.S. Cl. ...................................................... 361/104

(58) Field of Classification Search ................. 361/104
See application file for complete search history.

(56) References Cited

U.S. PATENT DOCUMENTS 3,889,757 A * 6/1975 Dunn .......................... 169/59
4,052,690 A * 10/1977 Jacoby ........................ 337/405
4,366,462 A 12/1982 Hollweck .................. 377/409

OTHER PUBLICATIONS

International Search Report for PCT/US03/29921, dated Apr. 5, 2004.
International Preliminary Examination Report for PCT/US03/29921, dated May 26, 2004.
Globe Technologies Corp. (Standish, Michigan), Model EFL-M Thermal Actuated Safety Switch, http://www.globetechnologies.com/hydro-electric.php (last visited Dec. 18, 2007).

* cited by examiner

*Primary Examiner*—Stephen W. Jackson
(74) *Attorney, Agent, or Firm*—Abelman Frayne & Schwab

(57) ABSTRACT

An electrical terminal block has a heat-meltable fusible link establishing a closed electrical circuit between a conductor and an actuator responsive to a control signal transmitted by conductor for controlling the state of an emergency process control device, such as a shut-off valve. The heat-meltable fusible link melts in response to ambient heat exceeding a predetermined temperature to establish an open electrical circuit between the electrical conductor and the actuator thereby causing the actuator to move the emergency process control device to a safe position or state.

20 Claims, 3 Drawing Sheets

FIRE SAFETY FUSIBLE LINK ELECTRICAL TERMINAL BLOCK

FIELD OF THE INVENTION

This invention relates to electrical circuits that are normally energized to maintain emergency control devices, such as shut-off valves.

BACKGROUND OF THE INVENTION

When devices are installed as part of safety instrumented systems (SIS), the signal from the safety programmable logic circuit (PLC) causes the device to change its position or state in such a way that will bring the process to a safe state or condition. Typically, the signals are energized during normal plant operations. Therefore, should a wire come loose, a wire break or the circuit be otherwise interrupted, the device in the field functions to move the valve to a fail-safe position. This type of design is known as a "normally energized" or "fail safe" system.

When industrial control instrumentation, such as emergency isolation valve controllers, are installed in fire hazard zones, special apparatus and methods must be utilized to ensure that the necessary safety control functions will be activated, even under the worst-case fire conditions.

Emergency isolation or shut-off valves ("EIV") are installed in a wide variety of manufacturing and processing facilities, including petroleum refineries, hydrocarbon processing plants, and in pipelines and tank farms for the purpose of isolating a potential source of fuel or other hazardous materials in the event of a fire. Industrial fire safety standards require fireproofing of emergency safety valve actuators and their critical control components so they can withstand the effects of a hydrocarbon fire for at least 20 minutes and remain functional. One type of EIV is fitted with a pneumatically pressurized actuator having an internal spring that moves the valve to the fail safe position when the pressure is vented from the actuator.

In lieu of, or as a supplement to an externally installed fireproof or fire and heat resistant housing, shielding, or the like, it has been known to incorporate fusible fittings or links in the pneumatic supply lines to such actuator. The fusible link in the pneumatic supply line provides this protection by venting or discharging the air supply at a predetermined temperature, thereby allowing the actuator to move the valve to the fail-safe position.

When the isolation valve is so large as to preclude the use of an actuator having an internal biasing spring to move the valve to the desired safe or emergency position, double-acting actuators are utilized. In this case, the actuator and all associated controls must be made fail-safe in the event of fire. The fireproofing process increases the cost of valve actuators and controls and, in some cases, requires bulky external blankets or boxes that are both cumbersome and costly.

SUMMARY OF THE INVENTION

In the "fusible link" terminal block housing of the invention, the link is preferably on the final control device itself. A conductive material with a known melting point is installed. Alternatively, a spring loaded switch, where a screw manufactured from a low melting-point material maintains the electrical circuit in the closed position, can be used. In either case, the function is the same: when the circuit is opened or broken under fire conditions, the actuator moves the final control element (valve) to the desired safe position.

The electronic control devices associated with emergency shut-down valves are designed to fail to a safe state in a fire. Specifically, the terminal blocks that serve as the connection point between the external plant wiring and the control device open the circuit when heat from a fire reaches a predetermined level. As with the pneumatic heat fusible link or fittings and the spring return pneumatic actuators, fireproofing is no longer required. Plant safety is improved, as the control device detects the fire condition in the field independently of the Emergency Shutdown System and moves the associated emergency shut-down valve to the safe position.

The fusible link terminal would serve to open the circuitry between the safety PLC and the final control device, having the effect of de-energizing the circuit under fire conditions. This allows the device to function in the intended manner to move the valve to the fail safe position before the fire destroys the capability of the device to function.

The invention broadly comprehends an electrical terminal block for receiving and securing electrical conductors that is designed in accordance with the operating principles and the methods described. The terminal block connects the wiring from the safety PLC to the final valve or other process control device. Through the use of a special heat fusible link installed in the terminal block itself, in the event that causes the link to melt or otherwise fail and break the circuit, the final control element moves to the fail safe position just as it would if the safety PLC interrupted the output signal to the device.

In addition to improving fire safety, an advantage of the invention is to eliminate the need for expensive and bulky fireproofing of critical electrical safety control devices.

Should the fusible link terminal block open prematurely (safe failure resulting in a nuisance EIV closure) an integral "tender-timer" type indicator will alert operations to the fault to facilitate repairs to restore full EIV operations.

Emergency shut-down valves are only one type of automated safety control device that operates in a "normally energized" manner. The "fusible link" terminal block has wide applications in the safety industry. Other applications include solenoid valves and smart valve positioners used to control emergency isolation valves.

DETAILED DESCRIPTION OF THE INVENTION

Referring to FIGS. 1-4, a system 10 and method 100 utilize a fire safety fusible link terminal block for maintaining emergency control devices in the event of emergencies.

Figure 1:
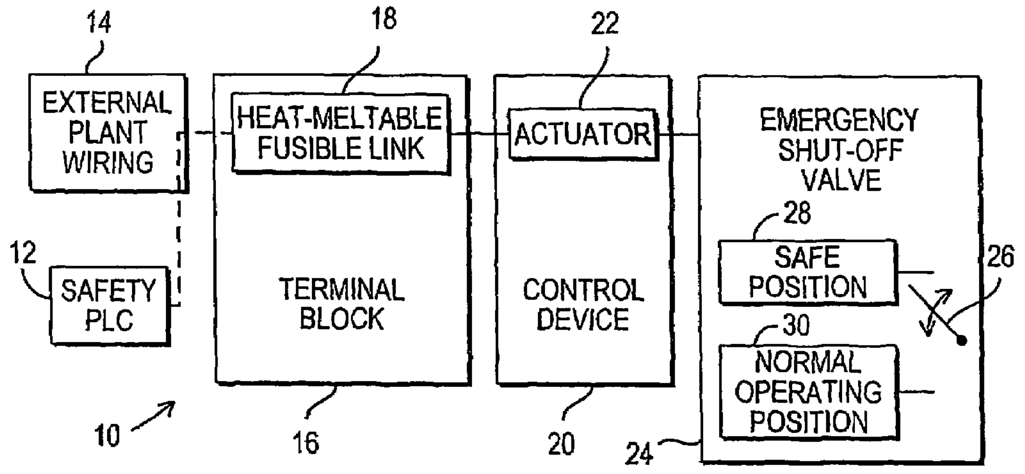
FIG. 1 is a schematic illustrating a system including a fire safety fusible link terminal block.

As shown in FIG. 1, the system 10 includes a safety PLC 12 which is wired through the external plant wiring 14 of a facility to a terminal block 16 having a heat-meltable fusible link 18. The safety PLC 12 is electrically connected through the external plant wiring 14 and through the heat-meltable fusible link of the terminal block 16 to a control device 20 having an actuator 22 which controls an emergency shut-off valve 24 having a valve arm 26 in either a fail-safe position 28 (in emergencies) or a normal operating position 30.

The terminal block 16 with the heat-meltable fusible link 18 is physically positioned substantially adjacent the control device 20. The heat-meltable fusible link 18 is composed of known materials having a predetermined temperature at which the fusible link 18 melts and creates an open electrical circuit or path across the fusible link 18.

In non-emergency operations, the heat-meltable fusible link 18 provides a closed electrical circuit through the terminal block 16, allowing control signals from the PLC 12 to be communicated to the actuator 22 in order to control the emergency shut-off valve 24 to respond to routine safety PLC.

During emergency operations when heat in the vicinity of the control device 20 exceeds a predetermined value such as a minimum temperature due to, for example, a fire, the heat-meltable fusible link 18 melts, causing an open electrical circuit condition to be present at the input from the fusible link 18 to the actuator 22. The actuator 22 responds to the open electrical circuit condition by moving the valve arm 26 of the emergency shut-off valve 24 to the fail-safe position 28.

During emergency conditions, which can possibly prevent the safety PLC 12 from communicating with the actuator 22 to control the emergency shut-off valve 24, the melting of the heat-meltable fusible link 18 automatically causes the actuator 22 to move the emergency shut-off valve 24 to the fail-safe position to respond to the emergency conditions.

Figure 2:
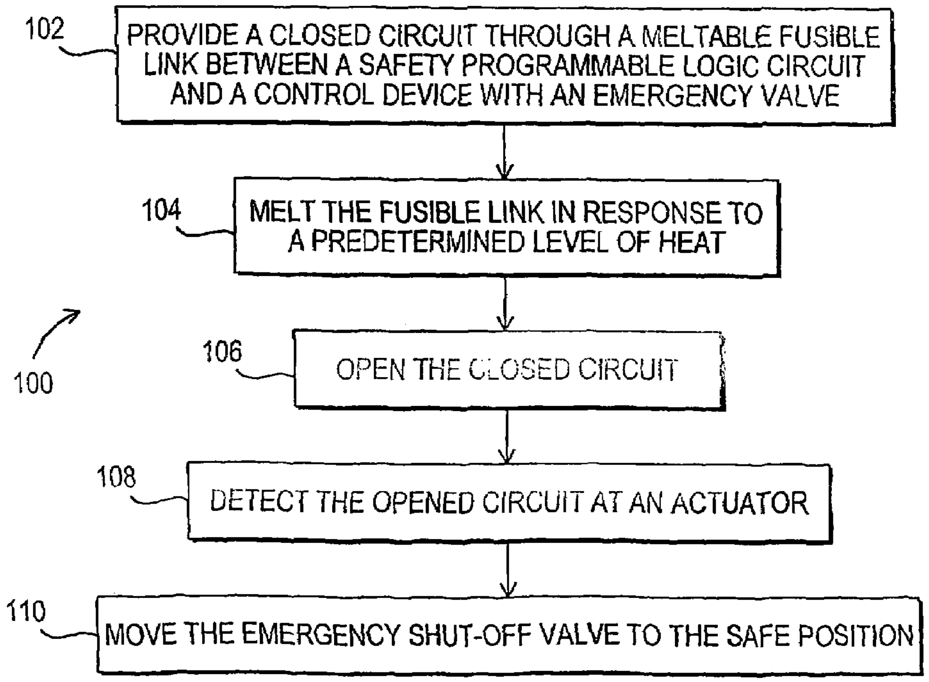
FIG. 2 is a flowchart illustrating a method of operation of the system of FIG. 1.

The system 10 operates according to the method 100 shown in FIG. 2, in which a closed circuit is provided in step 102 through the meltable fusible link 18 between a safety programmable logic circuit (PLC) 12 and the control device 20 with an emergency valve 24. The fusible link 18 melts in response to a predetermined level of heat in step 104, and then opens the closed circuit in step 106. The actuator 22 detects the opened circuit in step 108, and causes the emergency shut-off valve 24, or the valve arm 26 thereof, to move to the fail-safe position 28 in step 110.

Figure 3:
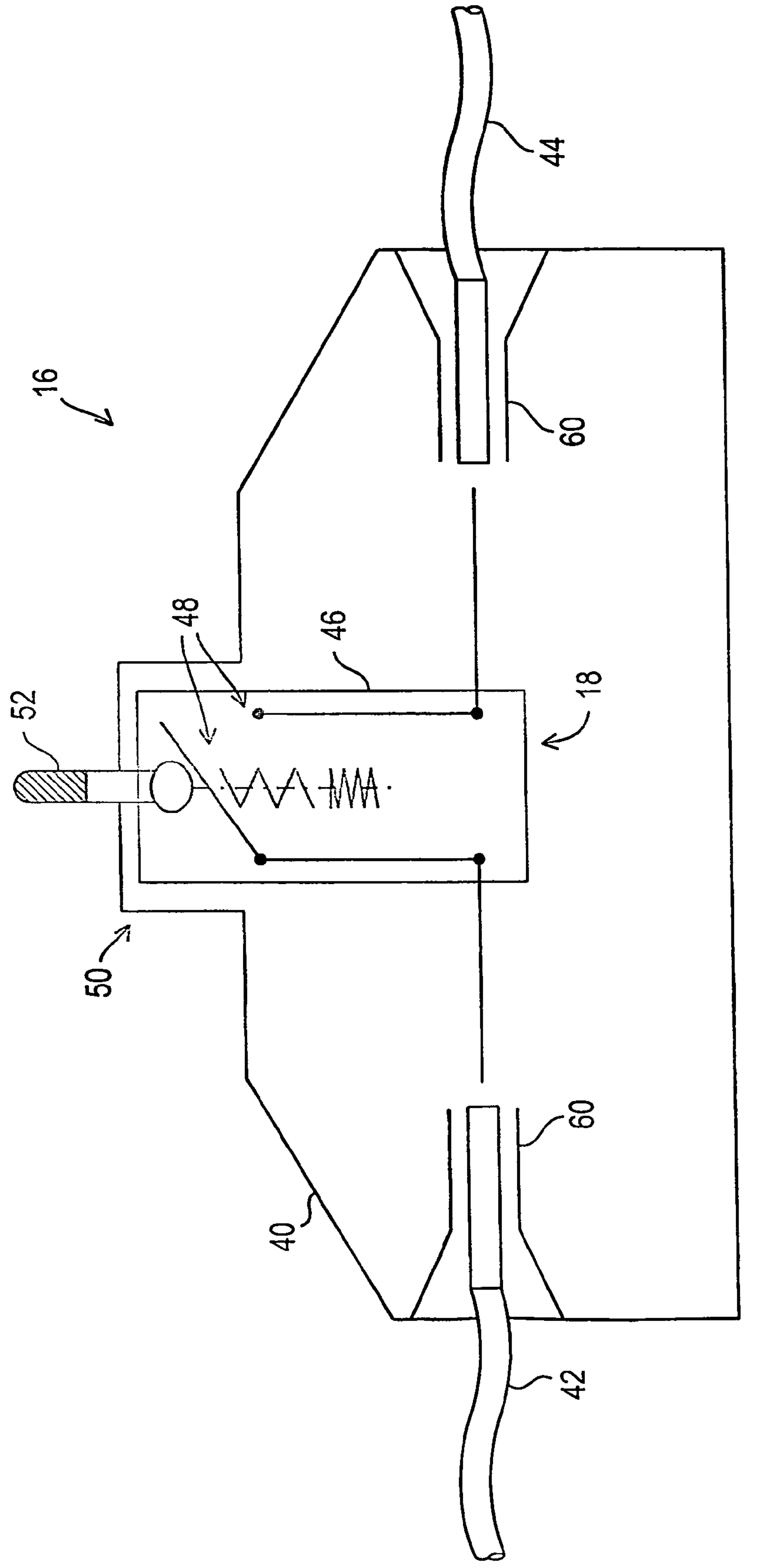
FIG. 3 is a side cross-sectional schematic illustrating one preferred embodiment of a fire safety fusible link terminal block of the invention.
Figure 4:
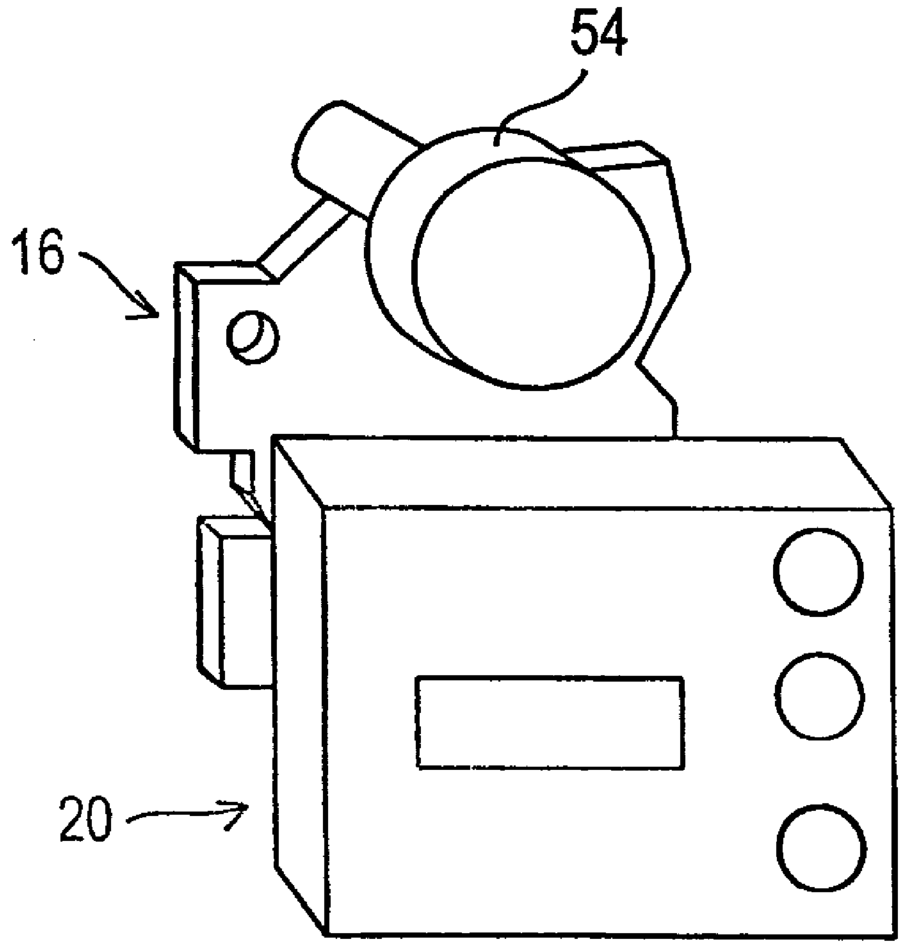
FIG. 4 is a side elevation view illustrating the fire safety fusible link terminal block of FIG. 3.

An example embodiment of the fire safety fusible link terminal block 16 of FIG. 1 is illustrated in greater detail in FIGS. 3-4. FIG. 3 is a side cross-sectional schematic illustrating a conceptual fire safety fusible link terminal block, and FIG. 4 is a side elevation view illustrating the fire safety fusible link terminal block of FIG. 3.

Referring to FIG. 3, the fire safety fusible link terminal block 16 includes a housing 40, having mounting mechanisms or other devices for positioning the fire safety fusible link terminal block 16 substantially adjacent to the control device 20 and/or other equipment, for example, on the housing of such equipment where the fire sense point of the fire safety fusible link terminal block 16 is exposed to the risk area.

The fire safety fusible link terminal block 16 is provided with connecors 60 adapted to receive the ends of signal conducting wires 42, 44 from the external plant wiring 14 and the control device 20 shown in FIG. 1. The wires 42, 44 are connected internally to the heat-meltable fusible link 18, which can include a spring-loaded screw-type terminal 46, having a spring-loaded switch contact 48. The heat-meltable fusible link 18 can also include an indicator device 50. The spring-loaded screw-type terminal 46 is composed of meltable material selected to fail at a predetermined temperature, which allows the spring-loaded contact 48 to open upon melting of the terminal 46 due to exposure to heat from a fire, thus de-energizing the safety circuit.

When the spring-loaded contact 48 opens, the indicator device 50 is activated to alert operations to the fault to facilitate repairs to restore full EIV operations. In one embodiment, the indicator device 50 can include an integral "tender-timer" type indicator 52 which is partially or completely concealed within the housing 40 when the spring-loaded contact 48 is closed. When spring-loaded contact 48 opens, the movement of the spring-loaded contact 48 to the open position extends the "tender-timer" type indicator 52 outward from the housing 40 to be visible to operations personnel. The "tender-timer" type indicator 52 can also have a distinct and visible color to alert operations that the spring-loaded contact 48 has opened.

Referring to FIG. 4, the fire safety fusible link terminal block 16 can be mounted in conjunction with emergency shutdown signal wire termination enclosure 54 on a control device such as a smart valve positioner 20. The control device 20 is mounted on a valve that requires "fail-safe" action in the event of a fire. Thus, when the indicator device 50, such as the "tender-timer" type indicator 52, is activated, the smart valve positioner device 20 moves control emergency isolation valves 24 to its fail safe position.

What is claimed is:

1. An electrical terminal block comprising:

a heat-meltable fusible link establishing a normally closed electrical circuit between wiring and an actuator responsive to a control signal transmitted by the wiring for controlling the state of an emergency process control device, wherein the heat-meltable fusible link melts in response to ambient heat exceeding a predetermined temperature to thereby establish an open electrical circuit between the wiring and the actuator for controlling the state of the emergency process control device.

2. The terminal block of claim 1, wherein the process control device is a shut-off valve.

3. The terminal block of claim 1, wherein the fusible link is selected from the group consisting of screws, conductor terminals, wiring couplings and conductive wire.

4. A method comprising the steps of:

providing a normally closed electrical circuit between electrical conductors and an actuator for an emergency process control device through a heat-meltable fusible link in a terminal block for communication of a control signal from the conductor to the actuator to control the emergency process control device; and melting the fusible link in response to heat exceeding a predetermined environmental temperature to thereby open the normally closed electrical circuit between the conductor and the actuator, whereby the emergency process control device moves to a safe state.

5. An electrical terminal block comprising:

a heat-meltable fusible link establishing a normally closed electrical circuit between wiring and an actuator responsive to a control signal transmitted by the wiring for controlling the state of an emergency process control device, wherein the heat-meltable fusible link has a known melting point such that the heat-meltable fusible link melts in response to ambient heat exceeding a predetermined temperature to thereby establish an open electrical circuit between the wiring and the actuator for controlling the state of the emergency process control device.

6. The terminal block of claim 5, wherein the heat-meltable fusible link is composed of a conductive material with the known melting point.

7. The terminal block of claim 5, wherein the heat-meltable fusible link is a spring-loaded switch, maintained in the closed position by a screw composed of a low melting-point material.

8. The terminal block of claim 5, wherein the heat-meltable fusible link melts in response to heat from a fire exceeding a predetermined temperature.

9. The terminal block of claim 5, wherein the process control device is a shut-off valve which de-energizes the circuit under fire conditions.

10. The terminal block of claim 5, wherein the fusible link is selected from the group consisting of screws, conductor terminals, wire couplings and conductive wire.

11. The terminal block of claim 5, wherein the heat-meltable fusible link is physically positioned substantially adjacent to the actuator.

12. The terminal block of claim 5, wherein the open electrical circuit between the wiring and the actuator for controlling the state of the emergency process control device causes a valve device of the emergency process control device to move to a fail-safe position.

13. The terminal block of claim 12, wherein the valve device is an emergency shut-off valve.

14. The terminal block of claim 12, wherein the valve device is a valve arm.

15. A method comprising the steps of:

providing a normally closed electrical circuit between electrical conductors and an actuator for an emergency process control device through a heat-meltable fusible link in a terminal block for communication of a control signal from the conductor to the actuator to control the emergency process control device, wherein the heat-meltable fusible link has a known melting point; and melting the fusible link in response to heat exceeding a predetermined environmental temperature to thereby open the normally closed electrical circuit between the conductor and the actuator, whereby the emergency process control device moves to a safe state.

16. The method of claim 15, wherein the fusible link melts in response to heat from a fire exceeding the predetermined environmental temperature.

17. The method of claim 15, wherein the open electrical circuit between the wiring and the actuator for controlling the state of the emergency process control device causes a valve device of the emergency process control device to move to a fail-safe position.

18. The method of claim 15, further comprising the steps of:

detecting the opened circuit at the actuator; and moving a valve device of the emergency process control device to a safe state.

19. The method of claim 15, wherein the valve device is an emergency shut-off valve.

20. The method of claim 15, wherein the valve device is a valve arm.

* * * * *